United States Patent [19]

Liang et al.

[11] Patent Number: 4,905,089

[45] Date of Patent: Feb. 27, 1990

[54] FILTER SCREEN FOR CATHODE RAY TUBES

[75] Inventors: Paul M. Liang; Tony H. Wen, both of Taipei, Taiwan

[73] Assignee: RCS Technology Corporation, Taipei, Taiwan

[21] Appl. No.: 293,068

[22] Filed: Jan. 3, 1989

[51] Int. Cl.$^4$ .............................................. H04N 5/65
[52] U.S. Cl. .................................. 358/247; 358/245; 174/35 MS
[58] Field of Search ............... 358/245, 246, 247, 252, 358/253; 174/35 MS

[56] References Cited

U.S. PATENT DOCUMENTS

| | | | |
|---|---|---|---|
| 4,381,421 | 4/1983 | Coats et al. | 358/245 |
| 4,468,702 | 8/1984 | Jandrell | 358/245 |
| 4,514,585 | 4/1985 | Paynton | 358/245 |
| 4,633,322 | 12/1986 | Fourny | 358/247 |
| 4,745,518 | 5/1988 | Fang | 358/252 |
| 4,760,456 | 7/1988 | Liang | 174/35 MS |
| 4,819,085 | 4/1989 | Liang | 358/245 |

FOREIGN PATENT DOCUMENTS

| | | | |
|---|---|---|---|
| 1379018 | 5/1966 | France | 358/247 |
| 2067380 | 7/1981 | United Kingdom | 358/252 |

Primary Examiner—Edward L. Coles, Sr.
Assistant Examiner—Jerome Grant, II
Attorney, Agent, or Firm—Thomas J. Dodd

[57] ABSTRACT

A filter screen for cathode ray tubes (CRT) which diffuses electromagnetic radiation. The screen is encased in a frame which includes a conductive frame element. The frame is attached to the CRT by one or more hangers which extend from the frame.

9 Claims, 6 Drawing Sheets

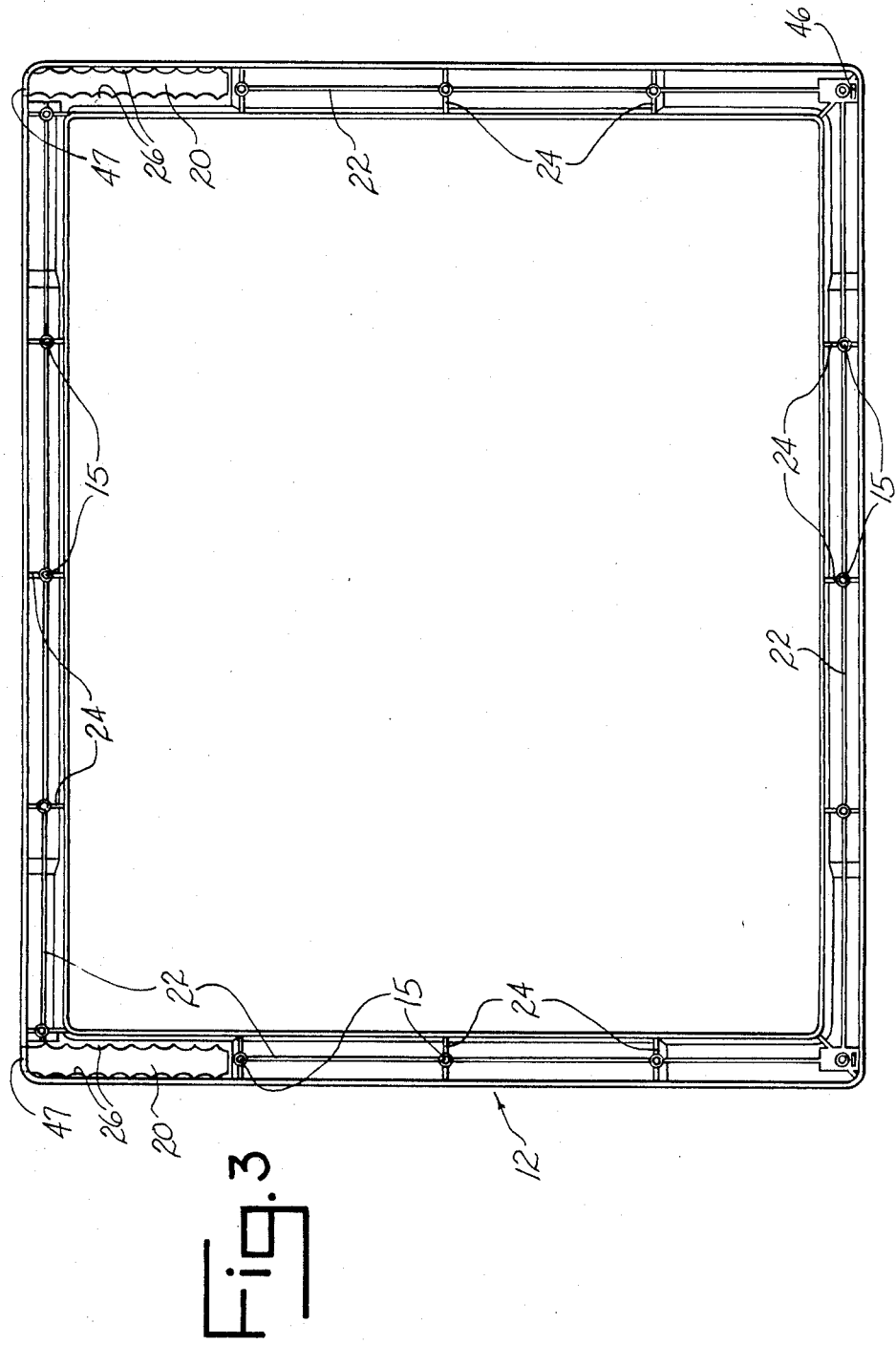

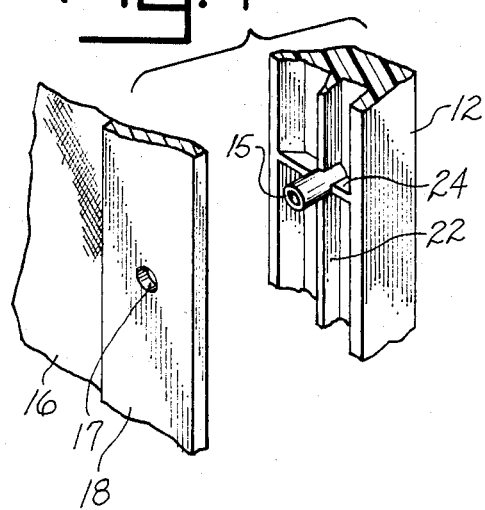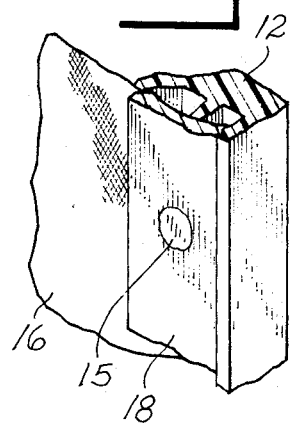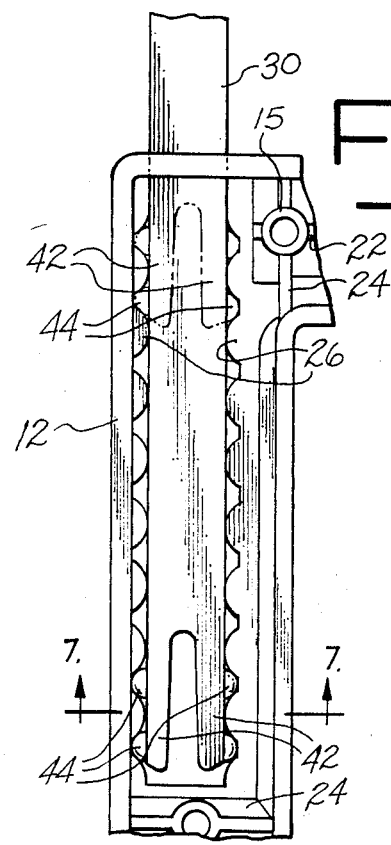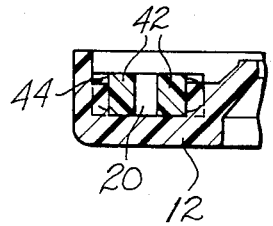

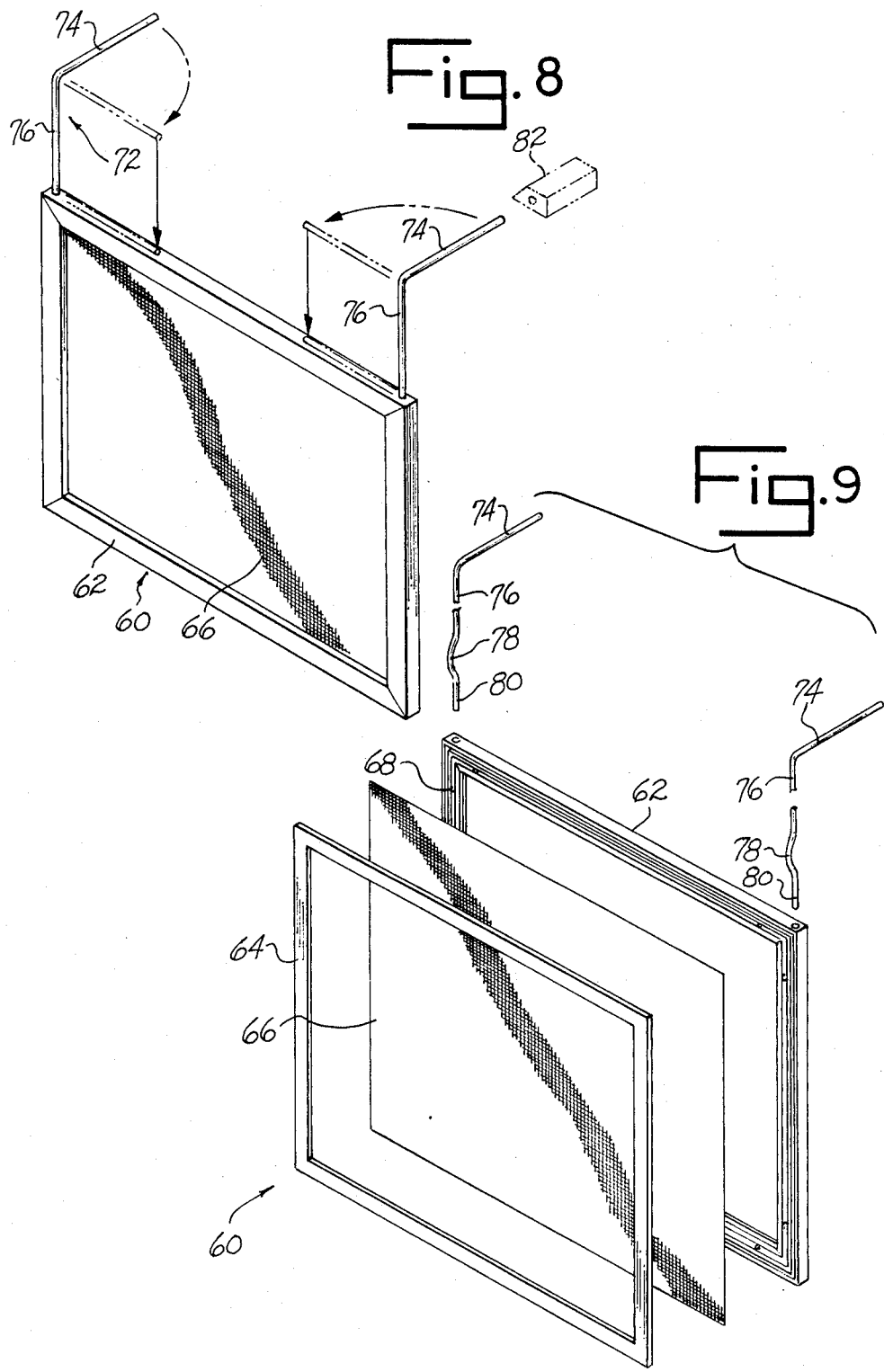

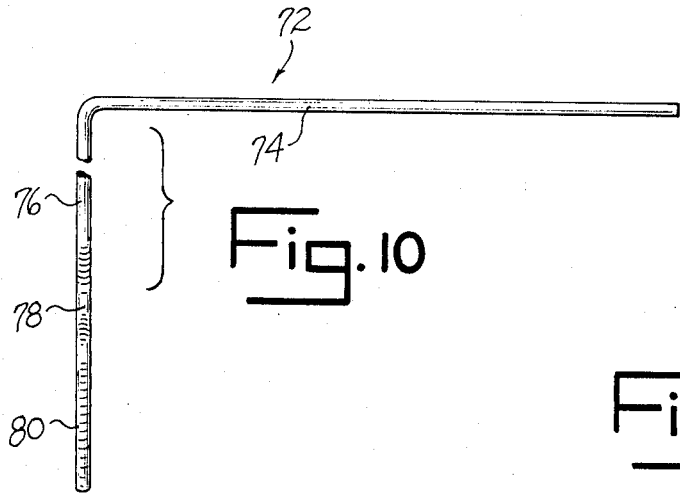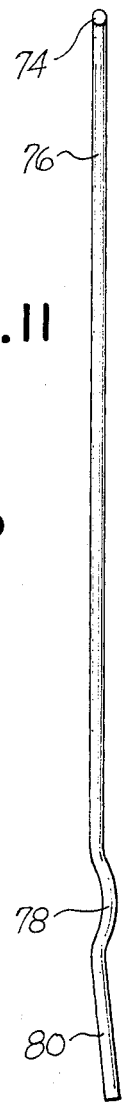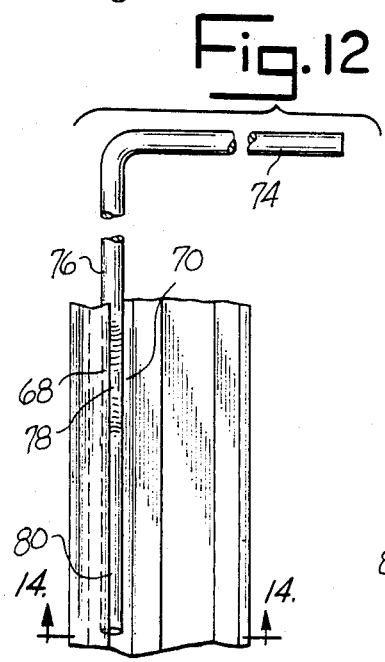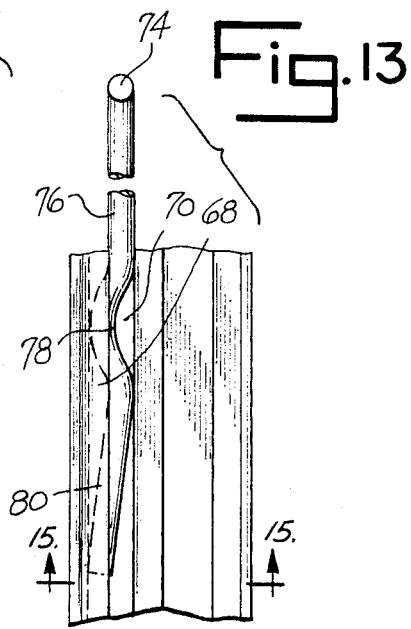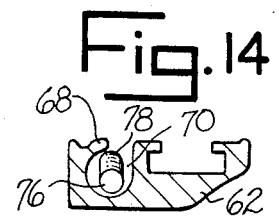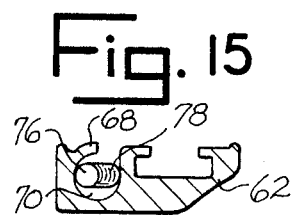

FILTER SCREEN FOR CATHODE RAY TUBES

FIELD OF THE INVENTION

This invention relates to filters and will have special application to a CRT filter encased in a frame which may be mounted to the CRT housing.

BACKGROUND OF THE INVENTION

Filter screens for video display terminals (VDT) such as cathode ray tubes (CRT) have become popular items in the computer market of late. Numerous types of these screens are currently available, most notably the screens shown in my U.S. Pat. No. 4,760,456 and my U.S. patent application Ser. No. 068,362, both of which are incorporated herein by reference.

These screens are placed in front of the CRT and serve to reduce glare and diffuse the electromagnetic radiation generated by the CRT screen to protect the operator. The screens are generally formed of a plurality of interwoven conductive fibers produced according to the method outlined in my U.S. Pat. No. 4,661,376. The screen is encased in a frame which includes a ground wire in communication with the screen to divert electromagnetic radiation away from the operator. Other devices used to reduce glare and electromagnetic radiation output from a VDT are shown in U.S. Pat. Nos. 2,97,412; 4,381,421; 4,468,702; and 4,514,585.

U.S. Pat. No. 2,977,412 discloses a glare reducing screen mounted in front of a television picture tube, with the screen formed of non-conductive mesh fibers mounted to a safety glass panel.

U.S. Pat. No. 4,381,421 discloses mounting a radiation diffusing screen between two glass panels which are then encased in a frame and mounted to a VDT housing by screw fasteners.

U.S. Pat. No. 4,468,702 discloses a mesh screen held in a frame which is sandwiched in a CRT housing in front of the display.

U.S. Pat. No. 4,514,585 discloses a filter mounted directly to the display surface of a CRT.

SUMMARY OF THE INVENTION

The filter screen of this invention is formed of conductive mesh fibers and is mounted in a flexible frame which includes adjustable hangers extending outwardly of the frame. The hangers allow the screen and frame to be mounted to a variety of types of CRT devices and are easily installed, adjusted or removed due to the flexible frame and the adjustability of the hangers. Rigid frames may also be utilized with the adjustable hangers.

Accordingly, it is an object of this invention to provide for a novel and improved filter screen for VDT's.

Another object of this invention is to provide for a CRT filter screen which is easily and rapidly installed and removed on a variety of CRT sizes and configurations.

Another object of this invention is to provide for a CRT filter screen which is easy to product at a lower cost than previous CRT screens.

Another object of this invention is to provide for a CRT filter screen which is adjustable and which efficiently reduces glare and diffuses CRT emanated electromagnetic radiation.

Other objects of this invention will become apparent upon a reading of the following description.

BRIEF DESCRIPTION OF THE DRAWINGS

FIG. 3 is an elevation view of the outer screen frame.

FIG. 4 is a fragmentary perspective view of the front outer frame and the metal inner frame prior to connection.

FIG. 5 is a fragmentary perspective view similar to FIG. 5 after connection.

FIG. 6 is a fragmentary sectional view which illustrates the hanger adjustment device.

FIG. 7 is a fragmentary cross-sectional view taken along line 7—7 of FIG. 6.

FIG. 8 is a perspective view of a second embodiment of the filter screen.

FIG. 9 is an exploded view of the filter screen of FIG. 8.

FIG. 10 is an elevation view of a rigid hanger in an insertion orientation.

FIG. 11 is an elevation view of the hanger in a securing orientation.

FIG. 12 is a fragmentary elevation view of the outer frame with the hanger in the insertion position.

FIG. 13 is a fragmentary elevation view of the outer frame with the hanger in the secured position.

FIG. 14 is a cross-sectional view taken along line 14-14 of FIG. 12.

FIG. 15 is a cross-sectional view taken along line 15-15 of FIG. 13.

DESCRIPTION OF THE PREFERRED EMBODIMENTS

Figure 1:
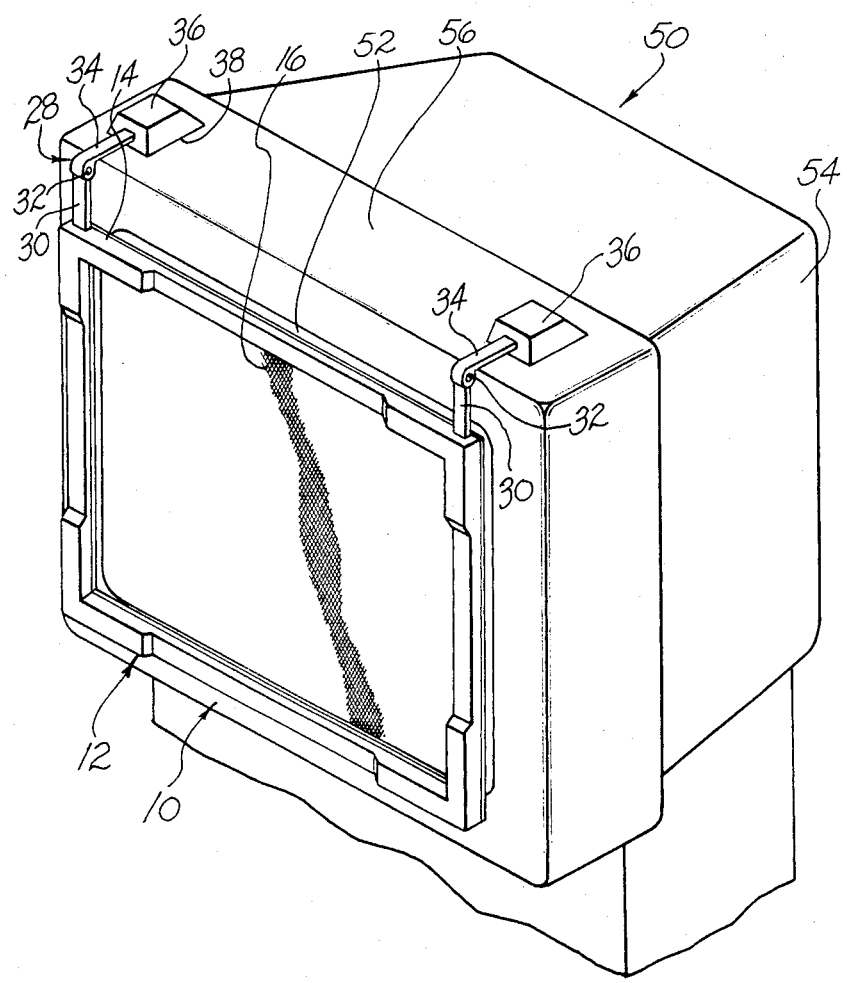
FIG. 1 is a perspective view of a first embodiment of a filter screen, shown attached to a CRT.

The preferred embodiments herein described are not intended to be exhaustive or to limit the invention to the precise forms disclosed. They are chosen and described to explain the principles of the invention and their application and practical use to thereby enable others skilled in the art to utilize the invention.

Referring now to FIGS. 1-7, reference numeral 10 refers generally to a first embodiment of the radiation elimination device which forms the subject matter of this invention. Device 10 includes a front outer frame member 12 and a back outer frame member 14, both of which are preferably formed of non-conductive flexible material such as ABS or PVC plastics. Device 10 also includes a filter screen 16 of the interwoven mesh type as described in my U.S. Pat. Nos. 4,661,376 and 4,760,456, which are incorporated herein by reference. Device 10 further includes an inner frame member 18 formed of a rigid or semi-rigid conductive material such as described in my U.S. patent application Ser. No. 068,362, filed July 1, 1987, incorporated herein by reference.

Figure 2:
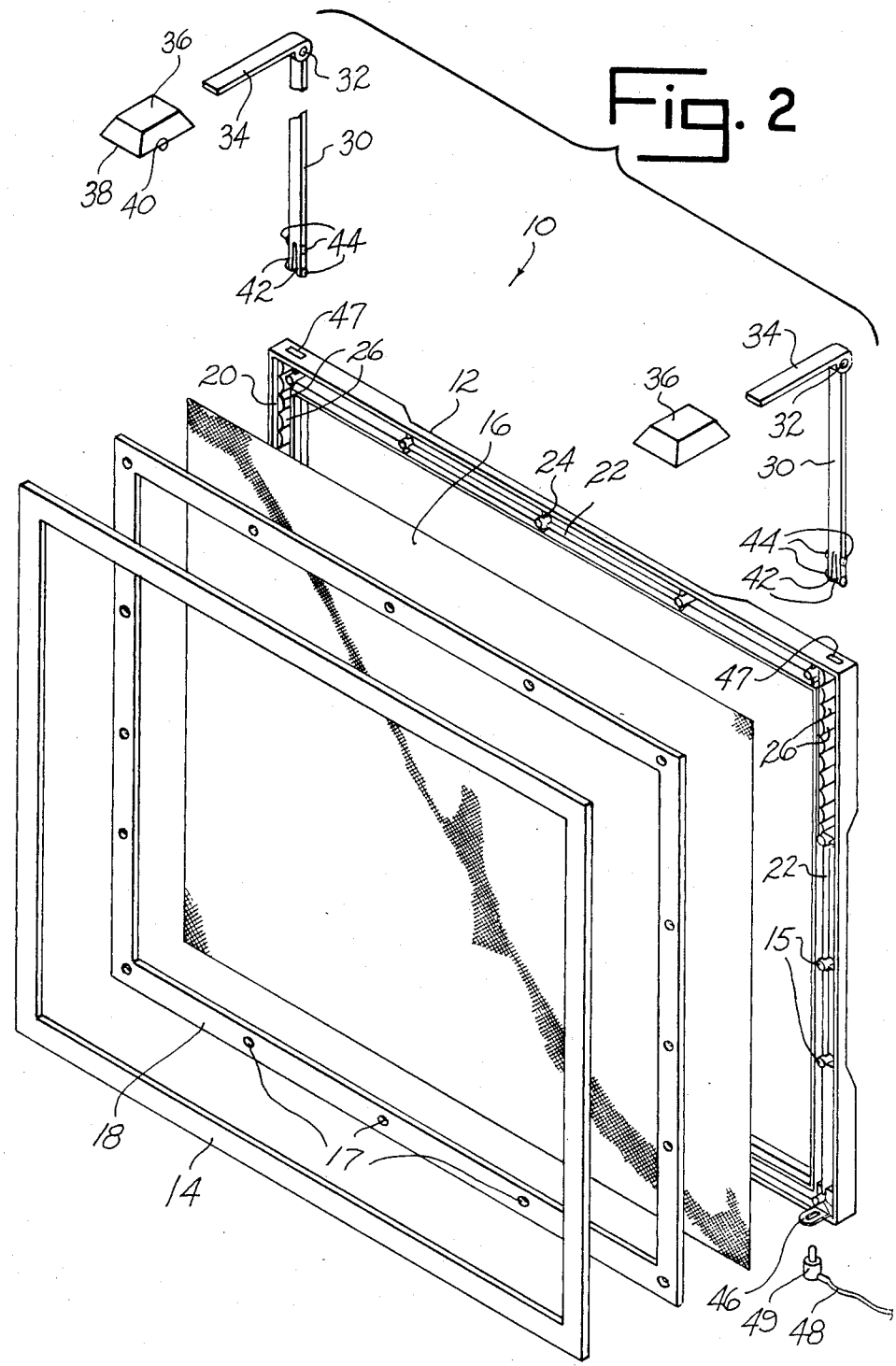
FIG. 2 is an exploded view of the filter screen of FIG. 1.

Front outer frame member 12 is shown in FIG. 2 as being a substantially U-shaped member defining a channel 20. Longitudinal and transverse stiffening ribs 22, 24, respectively, are integrally disposed in channel 20 as shown. A plurality of opposed, rounded indentations 26 are formed in channel 20 at the upper corners of outer frame member 12.

Device 10 further includes one or more flexible hangers (two shown) 28 fitted in frame 12. Each hanger 28 includes hanger bar 30 which extends beyond frame member 12 and is pivotally connected through pin 32 to CRT mounting bar 34. A pad 36 preferably formed of foam rubber or other cushioning material is attached to mounting bar 34. Pad 36 carries an adhesive tape 38 or similar adhesive coating on its surface 40 to allow connection of device 10 to a VDT such as the CRT 50 illustrated in the drawings.

Hanger bar 30 is preferably formed as shown in FIG. 2 having a slotted lower portion defined by separated prongs 42. One or more substantially spherical beads (two shown) 44 are formed on each outer edge of prongs 42, and cooperate with indentations 26 to allow selective manual adjustment of the distance hanger bar 30 extends beyond frame member 12. This adjustability feature allows device 10 to be mounted to a variety of sizes and configurations of CRT's 50. A ground terminal 46 is connected adjacent a lower corner of the frame member 12 and anchors a ground wire 48 which may be fixed to a terminal mount 49.

To assemble device 10, frame members 12, 14, and 18 and screen 16 are oriented as shown in FIG. 2 with holes 17 in frame member 18 aligned with bosses 15 of frame member 12. Ground wire 48 is preferably attached to terminal 46 by soldering mount 49 to the terminal. Screen 16 and frame member 18 are attached to frame member 12 by pushing bosses 15 through the screen and holes 17 in frame member 18 (FIG. 4). Heat is applied to bosses 15 to melt the bosses and secure the screen between secured frame members 12 and 18 (FIG. 5) with ground wire 48 in electrical communication with the screen. Frame member 14 is then secured to the back of frame member 12 by an adhesive or a surface coating to conceal and shield inner frame member 18.

Hangers 28 are then installed by pressing in on prongs 42 and inserting the prongs and beads 44 through hole 47 in frame member 12. When released, prongs 42 expand outwardly to allow beads 44 to restrictively contact indentations 26 and secure the hanger bar 30 within channel 20 of frame member 12. Because of the spherical configuration of beads 44, manual adjustment of hangers 28 within channel 20 is achievable.

To use device 10 to reduce glare and diffuse radiation from CRT 50, frame member 14 is placed over the display surface 52 of the CRT. Hanger bars 30 are then adjusted to the appropriate height dependent on the size of CRT housing 54 so that hinge pins 32 are level with the top wall 56 of the housing. Mounting bars 34 are then pivoted along pins 32 until pad surfaces 40 are substantially flush with the top wall 56 of housing 54. Pads 36 are then pressed into contact with housing top wall 56 and adhesive tape 38 causes the pads to adhere thereto. When in place, device 10, through screen 16 reduces glare from surface 52 and diffuses electromagnetic radiation through the screen and ground wire 48. If the CRT user (not shown) desires not to utilize device 10 he or she may simply pivot the device along pins 32 up and out of the way without having to physically remove the device from CRT 50.

FIGS. 8-15 illustrate a second embodiment of the device, referred to generally by reference numeral 60. Device 60 preferably includes a rigid frame member 62 and a flexible frame member 64. A screen 66 formed of interwoven conductive or non-conductive fibers is secured between frame members 62 and 64. Frame member 62 is preferably formed of metal such as aluminum or the like which has been coated with an insulative layer and includes a peripheral channel part 68 which defines a generally oval channel 70.

Device 60 also includes one or more hangers 72 which are preferably formed of one piece rigid material, such as a metal or a hard plastic. Each hanger (two are shown) 72 is bent at a predetermined angle (90° is shown) to form a CRT mounting portion 74 and a frame mounting portion 76. Frame mounting portion 76 of each hanger 72 includes a bowed portion 78 and an angled end portion 80 oriented at about a 90° angle from CRT mounting portion 74. Pads 82 which are the same type as pads 36 are connected to each hanger frame mounting portion 76.

Device 60 is assembled by securing frame members 62, 64 about screen 66 in a conventional fashion. Hangers 72 are then inserted into frame member channel 70 through holes 65 oriented as shown in FIG. 12. In this orientation, hangers 72 slide freely up and down in channel 70 as shown in FIG. 14 which allows for height adjustments to be made. To lock the hangers 72 in place, the hangers are rotated about frame mounting portion 76 approximately 90° into the position shown in FIG. 13. In this position, hanger bowed portion 78 and angled end portion 80 restrictively cam into contact with channel part 68 to secure hanger 72 in place. Device 60 may then be used with CRT 50 by pressing pads 82 onto top surface 56 of CRT housing 54 in the same fashion as device 10.

It is understood that the invention is not limited to the details above given, but may be modified within the scope of the appended claims.

We claim:

1. In combination, a screen formed of interwoven electrically conductive fibers, said screen constituting means for diffusing electromagnetic radiation emitted from a cathode ray tube, and a frame connected about a periphery of said screen, a ground wire connected to said screen, said screen and frame positioned adjacent to a cathode ray tube, the improvement wherein said frame includes non-conductive outer frame members which define an interior channel, a conductive inner frame member fitted in said channel with the screen and ground wire connected to the inner frame member, and a hanger connected to the frame, said hanger constituting means for positioning said frame and screen in front of said cathode ray tube.

2. The combination of claim 1 wherein said hanger includes first and second hanger members positioned at opposite side edge of the frame.

3. The combination of claim 1 wherein each hanger member includes a first hanger strip fitted in said interior channel and extending from said frame, a second hanger strip pivotally connected to said first hanger strip outside of the frame, and an attachment member connected to said second hanger strip, said attachment member constituting means for fastening the screen and frame to a housing of said cathode ray tube.

4. The combination of claim 3 wherein said attachment member is a padded cushion which defines a substantially flat lower surface which carries an adhesive for attachment to said housing.

5. The combination of claim 3 wherein said first hanger strip includes an outer bead, a plurality of indentations formed in said interior channel, said outer bead and indentations constituting means for allowing manually controlled variances in the distance that said first hanger strip extends from said frame.

6. The combination of claim 5 and a second outer bead formed on said first hanger strip opposite said second indentations formed in said frame channel opposed to the first mentioned indentations, said first hanger strip having a slotted end portion to form first and second prongs, said beads connected to said first and second prongs, wherein the prongs may be flexed towards one another as said first hanger strip is inserted into said channel.

7. The combination of claim 5 wherein said frame includes first and second connected frame parts defining an interior channel, each hanger including a rigid one piece angled hanger member fitted in said frame channel and extending upwardly of said frame, and an attachment member connected to each hanger member for fastening the screen and hanger to said cathode ray tube.

8. The combination of claim 7 wherein said first frame part is formed of electrically conductive material coated with an electrically insulative compound.

9. The combination of claim 7 wherein each hanger includes a bent portion positioned in said channel, said channel of a substantially oval cross sectional configuration whereby said hanger bent portion slides freely in said channel in a first orientation and engages side walls of said channel to secure the hanger to the frame in a second rotated orientation.

* * * * *